(12) United States Patent
Sullivan

(10) Patent No.: US 8,602,342 B2
(45) Date of Patent: Dec. 10, 2013

(54) YARN-CARRYING AND DISPENSING APPARATUS

(76) Inventor: Kathleen Sullivan, Cooperstown, NY (US)

( * ) Notice: Subject to any disclaimer, the term of this patent is extended or adjusted under 35 U.S.C. 154(b) by 346 days.

(21) Appl. No.: 12/909,490

(22) Filed: Oct. 21, 2010

(65) Prior Publication Data

US 2011/0089063 A1    Apr. 21, 2011

Related U.S. Application Data

(60) Provisional application No. 61/253,674, filed on Oct. 21, 2009.

(51) Int. Cl.
*B65H 55/00*    (2006.01)

(52) U.S. Cl.
USPC ........ 242/171; 242/566; 242/588.3; 242/129; 66/1 R; 223/107

(58) Field of Classification Search
USPC .............. 242/170, 171, 566, 588, 588.3, 590, 242/128, 129; 206/388, 392, 409, 389; 66/1 A, 1 R; 223/106, 107
See application file for complete search history.

(56) References Cited

U.S. PATENT DOCUMENTS

| | | | | |
|---|---|---|---|---|
| 724,623 | A * | 4/1903 | Shedlock | 242/137.1 |
| 1,119,238 | A * | 12/1914 | Brown | 242/146 |
| 1,384,602 | A * | 7/1921 | Crowell | 223/100 |
| 2,169,297 | A * | 8/1939 | Smith | 223/107 |
| 2,304,501 | A * | 12/1942 | Hommer | 242/137.1 |
| 4,173,311 | A | 11/1979 | Lucke | |
| 4,186,898 | A | 2/1980 | Wilson et al. | |
| 4,330,095 | A | 5/1982 | Carter | |
| 4,921,185 | A | 5/1990 | Baker | |
| D334,836 | S | 4/1993 | Litwin et al. | |
| D337,430 | S | 7/1993 | Gaither et al. | |
| 5,544,831 | A * | 8/1996 | Van Netta | 242/127 |
| 2007/0125897 | A1* | 6/2007 | Wijerama | 242/171 |
| 2008/0035512 | A1* | 2/2008 | Lee | 206/407 |
| 2009/0218245 | A1* | 9/2009 | Arnoff | 206/392 |

* cited by examiner

*Primary Examiner* — William E Dondero
(74) *Attorney, Agent, or Firm* — Sean Wooden; Andrews Kurth LLP

(57) ABSTRACT

Described herein are embodiments of a yarn-carrying and dispensing apparatus. The embodiments described allow knitters to easily transport, carry and use balls of yarn for knitting. The embodiments prevent the ball of yarn from rolling away or getting tangled or intertwined. The embodiments also easily and smoothly dispense the yarn, making the knitting more efficient and easier for the knitter.

13 Claims, 3 Drawing Sheets

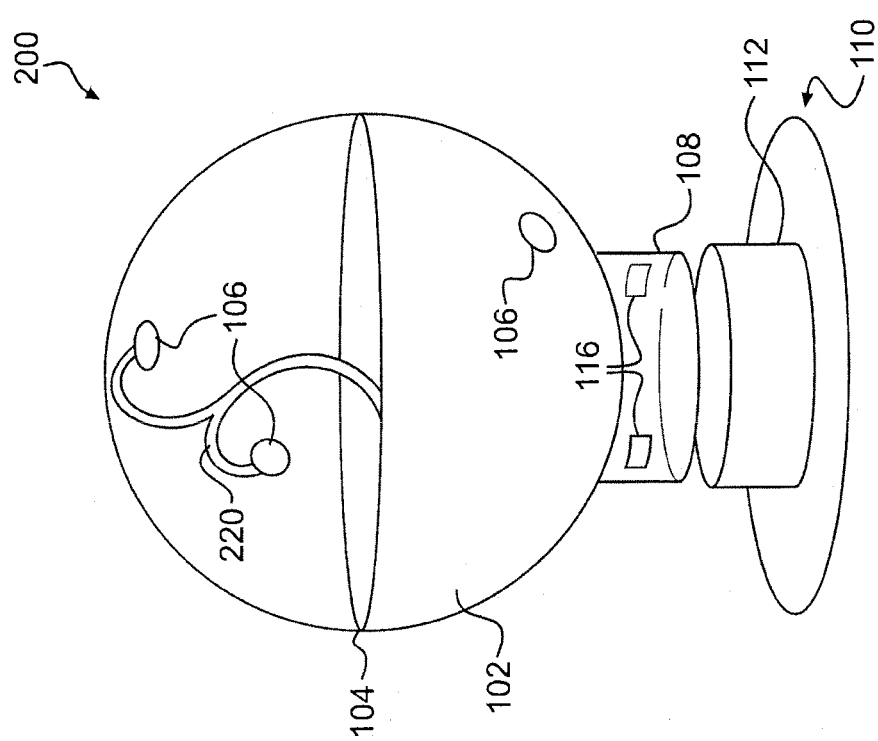

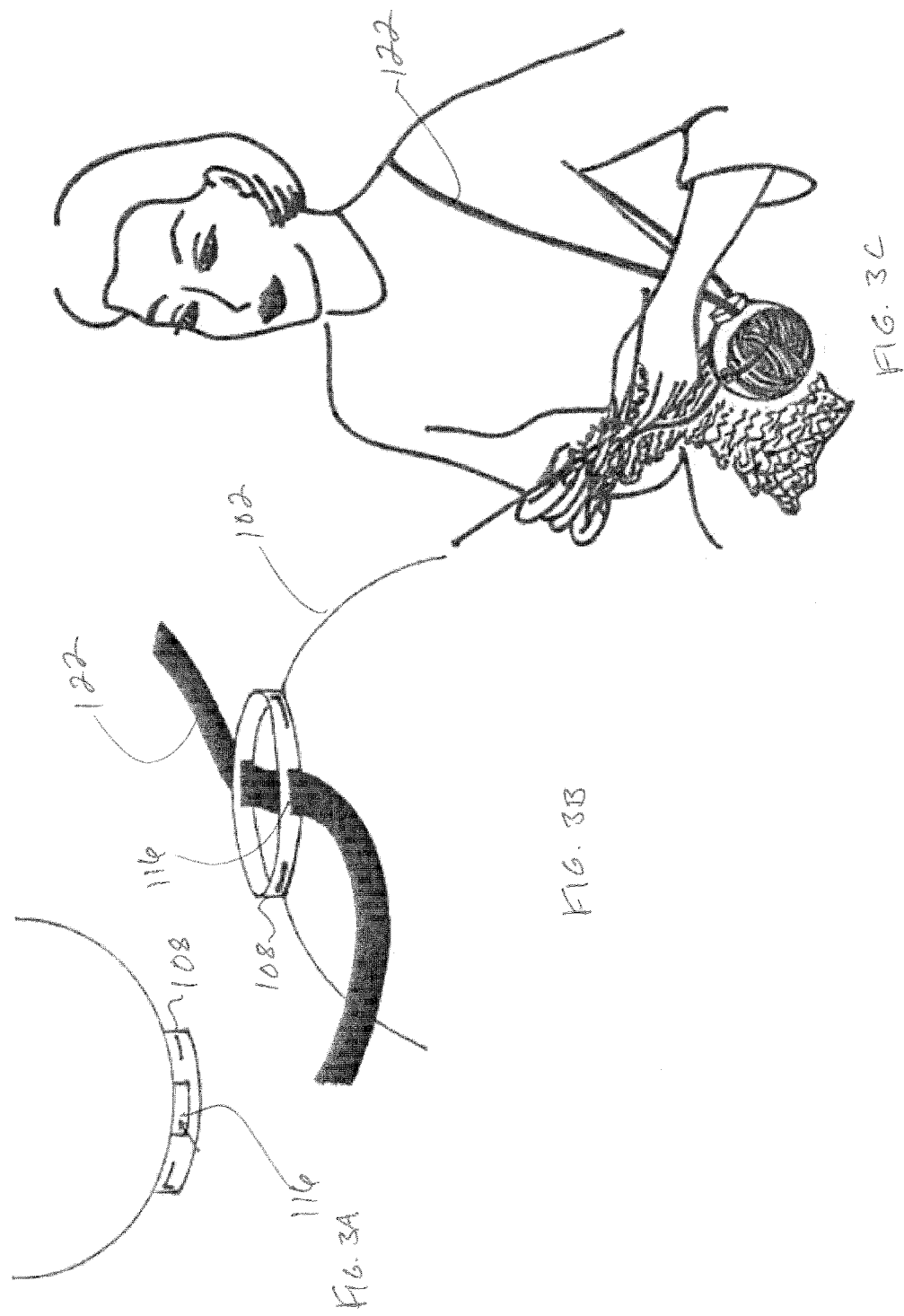

YARN-CARRYING AND DISPENSING APPARATUS

RELATED APPLICATIONS

This application claims the priority of U.S. Provisional Application Ser. No. 61/253,674, entitled "YARN-CARRYING AND DISPENSING APPARATUS" and filed Oct. 21, 2009, which is hereby incorporated by reference in its entirety.

BACKGROUND

Many people like to knit, whether as a hobby or a profession. Whether a professional or hobby knitter, all who knit suffer from the same dreaded problem: controlling a ball of yarn from tangling and containing it in a manner that keeps the yarn clean and safe from pets and children's curiosity.

No matter how careful a knitter is or how securely the knitter thinks they have corralled the ball of yarn, eventually the ball gets away from the knitter and finds its way onto the floor. Once on the floor, the ball of yarn will often roll across floor. When this happens, aside from the risk of becoming intertwined with other yarn, the ball of yarn may become "spoiled" by getting dirty from the floor. The ball of yarn is subjected to any and all bits and pieces of whatever debris is on the floor; lint, dirt, and the worst of worst, dreaded pet hairs. Aside from being very frustrating, spoiled yarn can result in a finished product that must now be washed or picked clean before wearing it or passing it on to the intended recipient.

Moreover, almost all who knit like to take their knitting with them when they know they will have some down time that will allow them to continue to work on their project. Knitters often knit while waiting for appointments such as in doctors, dentists or business offices, while sitting around for kids to finish sports, or school projects, while riding the bus or train to work and even while they have wait time on line for appointments like at motor vehicle office. Those who travel, either on vacation or business, especially love to take their knitting along with them. They knit while in the car, on the plane, riding the train, or on the bus, etcetera. Then once at their destination, such as the beach or in the hotel, they again pick up their beloved knitting. Unfortunately, when knitting on the go or at home, most knitters carry their yarn in big bulky yarn bags or baskets. The ball of yarn necessary for knitting can get tangled in the material bag, intertwined and tangled with other yarn or knitting materials in the bag.

An important technique of the art of knitting is to keep the gauge steady and even. This is so the knitted work has a smooth professional look and finish to it. Even the occasional knitter strives for this. If the knitter is constantly pulling to release the next length of yarn from a tangled ball, which happens constantly while trying to secure the ball, it makes it much harder to maintain that smooth even gauge.

Unfortunately, these problems with knitting prevent or discourage many knitters from bringing their knitting material with them when traveling and from knitting. There are no known devices for easily transporting and holding yarn while a knitter knits.

SUMMARY

An advantage of embodiment described herein is that they overcome disadvantages of the prior art. These and other advantages are provided by a yarn-carrying and dispensing apparatus. The yarn-carrying and dispensing apparatus includes a yarn-carrying portion that accommodates a ball of yarn, the yarn-carrying portion having a joint that allows the yarn-carrying portion to open so that the ball of yarn can be placed inside, and one or more yarn-dispensing holes through which the yarn is dispensed from the yarn-carrying portion, a base portion with a gasket portion and a bottom portion to allow the yarn-carrying and dispensing apparatus to sit on a surface, and a yarn-carrying collar portion that is affixed to a portion of the yarn-carrying portion to connect the yarn-carrying portion to the base portion.

These and other advantages are also provided by a yarn-carrying and dispensing apparatus that includes a yarn-carrying portion that accommodates a ball of yarn, the yarn-carrying portion having a joint that allows the yarn-carrying portion to open so that the ball of yarn can be placed inside, and one or more yarn-dispensing holes through which the yarn is dispensed from the yarn-carrying portion.

These and other advantages are also provided by a thread or string-carrying and dispensing apparatus. The thread or string-carrying and dispensing apparatus includes a thread or string-carrying portion that accommodates a ball of thread or string, the thread or string-carrying portion having a joint that allows the thread or string-carrying portion to open so that the ball of thread or string can be placed inside, and one or more thread or string-dispensing holes through which the thread or string is dispensed from the thread or string-carrying portion, a base portion with a gasket portion and a bottom portion to allow the thread or string-carrying and dispensing apparatus to sit on a surface, and a thread or string-carrying collar portion that is affixed to a portion of the thread or string-carrying portion to connect the thread or string-carrying portion to the base portion.

DESCRIPTION OF THE DRAWINGS

The detailed description will refer to the following drawings, wherein like numerals refer to like elements, and wherein:

FIG. 2 is a view of another embodiment of a yarn-carrying and dispensing apparatus with a weighted base.

FIGS. 3A through 3C illustrate a strap connected to the yarn-carrying portion to enable a user to easily carry around the yarn-carrying and dispensing apparatus.

DETAILED DESCRIPTION

Described herein are embodiments of a yarn-carrying and dispensing apparatus. The embodiments described allow knitters to easily transport, carry and use balls of yarn for knitting. The embodiments prevent the ball of yarn from rolling away or getting tangled or intertwined. The embodiments also easily and smoothly dispense the yarn, making the knitting more efficient and easier for the knitter.

Figure 1B:
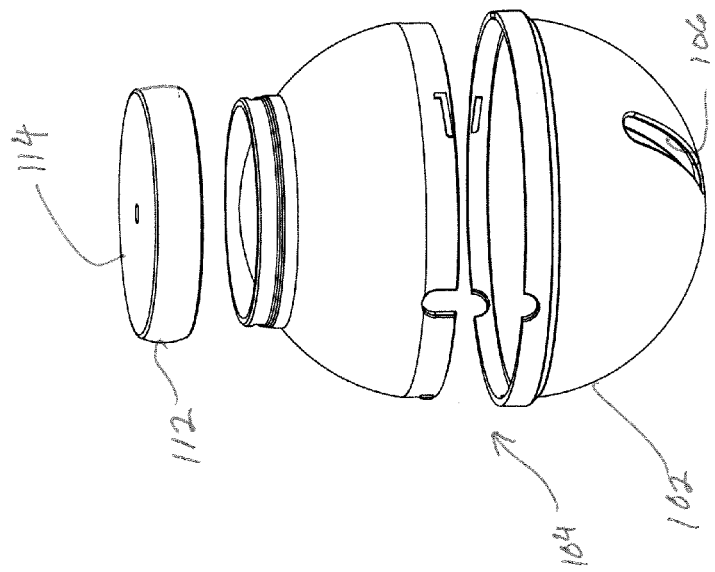
FIGS. 1A and 1B are views of an embodiment of a yarn-carrying and dispensing apparatus with a weighted base and ball of yarn contained therein.
Figure 1A:
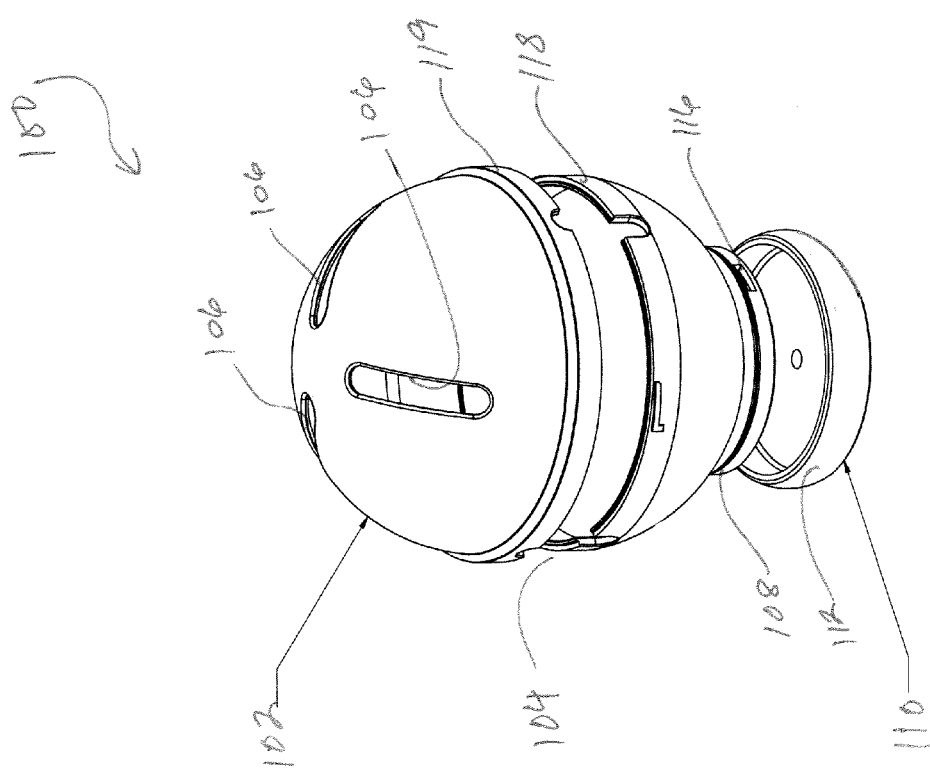

With reference to FIG. 1, shown is an embodiment 100 of a yarn-carrying and dispensing apparatus. The embodiment 100 of the yarn-carrying and dispensing apparatus includes a substantially hollow yarn-carrying portion 102. The yarn-carrying portion 102 in the embodiment shown is a ball or otherwise sphere-shaped. Such a shape accommodates a similarly spherically-shaped yarn ball (not shown) well. Other shaped yarn-carrying portions, such as cylindrical-shaped portions, that can accommodate differently shaped yarn gatherings such as yarn rolled on a tube or inverted cone, may be included in the yarn-carrying and dispensing apparatus. Alternatively, cubic-shaped, column-shaped or other-shaped yarn balls may be used (if flat-bottomed, collar and base portions described below may be omitted).

In the embodiment shown, the yarn-carrying portion 102 is a hollow plastic ball of approximately five (5) to six (6) inches in diameter. A variety of sized yarn-carrying portions may be used, including larger or smaller diameter balls. Plastic is a useful material for the yarn-carrying portion 102, as it is lightweight and easily obtainable, but other materials may be used such as glass, cardboard, or metals. Another advantage of plastic is that it may be transparent; accordingly, the embodiment shown is transparent, allowing the knitter to see how much yarn is remaining. However, the yarn-carrying portion may be opaque or translucent. The yarn-carrying portion 102 is typically lightweight enough to be easily carried, e.g., in a purse, bag, or pocket.

With continued reference to FIG. 1, the yarn-carrying portion 102 will typically have a joint 104 or other seem that allows it to open in the middle, or elsewhere, so that the yarn may be placed inside. In an embodiment, the joint 104 is a threaded-joint or other type joint that enables a top portion or half of the yarn-carrying portion 102 to screw or otherwise rotate into a bottom portion or half of the yarn-carrying portion. The two portions of the yarn-carrying portion 102 may also be connected via a hinge or other mechanisms (such as, e.g., one portion having a narrow-diameter edge or lip 118 that fits or snaps snugly inside the wider-diameter edge or lip 119 of the other portion) or the yarn-carrying portion 102 may have a "door" or other opening that allows the yarn to be placed into the yarn-carrying portion 102 (if the yarn-carrying portion 102 has such a door or other opening, it may be constructed as one solid piece and may omit the joint 104). In the embodiment shown, the yarn-carrying portion halves may be nested within one another, making the yarn-carrying and dispensing apparatus easy to store.

The yarn-carrying portion 102 shown may also include plurality of yarn-dispensing holes or openings 106 through which the yarn exits or dispenses from the yarn-carrying portion 102, as shown. The yarn-carrying portion 102 may only have one yarn-dispensing hole or opening 106, but a plurality of yarn-dispensing holes or opening 106 may enable the yarn to dispense at different angles and positions from the yarn-carrying portion 102. In the embodiment shown, the yarn-carrying portion 102 has three or four yarn-dispensing holes or openings 106. The yarn-dispensing holes or openings 106 may be of large enough diameter to pass the yarn easily through without significant resistance.

With continued reference to FIG. 1, the embodiment 100 of the yarn-carrying and dispensing apparatus also includes a yarn-carrying collar portion 108 (e.g., ball collar). The yarn-carrying collar portion 108 is typically affixed to a portion of the yarn-carrying portion 102 (e.g., at the bottom). In the embodiment shown, the yarn-carrying collar portion 108 serves multiple functions. The yarn-carrying collar portion 108 provides a mechanism for connecting the yarn-carrying portion 102 to a base portion 110. The yarn-carrying collar portion 108 also provides a mechanism for connecting the yarn-carrying portion 102 to straps or other device that enables the user to easily carry around the yarn-carrying and dispensing apparatus. With straps (not shown) attached to the yarn-carrying collar portion 108, a knitter may knit while standing with the yarn-carrying and dispensing apparatus 100 hanging from the knitter's shoulder and dispensing yarn.

The yarn-carrying collar portion 108 may include threads, latches or simply be sized to snugly fit in the base portion 110 (alternatively, the yarn-carrying portion 102 may connect directly to the base portion 110, omitting the collar portion 108). The yarn-carrying collar portion 108 may include openings 116 through which a strap 122 (FIGS. 3A through 3C) may be fed to hang from the shoulder. The strap 122 or other mechanism may also enable the yarn-carrying and dispensing apparatus to be connected to a belt. The openings 116 in the yarn-carrying collar portion 108 may also be configured to match up with extruding, flexible latches in the base portion 110 so that the yarn-carrying collar portion 108 snaps into the base portion 110, with the latches snapping into the openings 116. The yarn-carrying collar portion 108 may be affixed to the yarn-carrying portion 102 in any of a variety of known manners.

The yarn-carrying collar portion 108 may also be sized to fit snuggly in standard or non-standard drink holders in vehicles, trains, planes, etc. This enables the knitter to use the yarn-carrying and dispensing apparatus 100 and knit while traveling on such.

With continued reference to FIG. 1, the embodiment 100 of the yarn-carrying and dispensing apparatus shown includes a base portion 110. The base portion 110 is typically weighted and with a flat bottom so that the yarn-carrying and dispensing apparatus can easily and securely sit on a surface, such as a table or a knitters lap. The base portion 110 is typically weighted substantially enough to hold the yarn-carrying and dispensing apparatus in place when yarn is dispensed from the yarn-carrying portion 102. Accordingly, the base portion 110 may be made from glass or other such substantially heavy material to hold the yarn-carrying and dispensing apparatus in place.

The base portion 110 may include a gasket portion 112 that fits snugly around the yarn-carrying collar portion 108. Alternatively, the gasket portion 112 may fit within the yarn-carrying collar portion 108. Likewise, the gasket portion 112 may have latches or threads to connect to the yarn-carrying collar portion 108. Virtually any type of known connecting means may be used to connect the gasket 112 and the yarn-carrying collar portion 108. The gasket portion 112 may also have a rubber gasket or liner that helps it to snugly connect with the yarn-carrying collar portion 108.

Likewise, the base portion 110 may include a flat bottom portion 114 than enables the yarn-carrying and dispensing apparatus to easily rest on a flat surface, such as a table. The bottom portion 114 may be of wider, less or the same diameter as the gasket portion 112 and the yarn-carrying portion 102. Generally, a wider diameter bottom portion 114 will provide greater stability for the yarn-carrying and dispensing apparatus. However, so long as substantially weighted, the diameter of the bottom portion 114 may not be critical. Likewise, the flatness of the bottom portion 114 may not be necessary if the yarn-carrying and dispensing apparatus 100 will generally be used while sitting in the knitter's lap. In an alternative embodiment, the gasket portion 112 and bottom portion 114 may be formed as one piece.

The base portion 110 and the ball portion 102 (the yarn-carrying portion) are typically designed to easily come apart so that the knitter may travel with just the yarn-carrying portion 102, or separately carry both.

With reference to FIG. 2, shown is another embodiment 200 of the yarn-carrying and dispensing apparatus. In the embodiment shown, the yarn-carrying portion 102 includes yarn pass-through channels 220 that connect to the yarn-dispensing holes or openings 106. The yarn is threaded through the yarn pass-through channels 220 to the yarn-dispensing holes or openings 106. The channels 220 allow the yarn to be more effectively dispensed from the yarn ball or other yarn gathering in the yarn-carrying portion 102. As shown, the yarn pass-through channels 220 may be curved.

The yarn-carrying and dispensing apparatus may be used to contain yarn, thread, string or other similar material. The yarn-carrying and dispensing apparatus may be used while knitting, crocheting, cross-stitching, sewing or doing other work that involves loose and/or organized balls of material. The yarn-carrying and dispensing apparatus keeps the material secure and clean and dispenses the material in an easy to use manner With the yarn-carrying and dispensing apparatus, a knitter my knit or crochet, etc., on the way to work, at the ball-park, on a lunch hour, while waiting in line, while traveling, etc., because the yarn will be contained, clean and easily accessible and dispensed.

The terms and descriptions used herein are set forth by way of illustration only and are not meant as limitations. Those skilled in the art will recognize that many variations are possible within the spirit and scope of the invention.

What is claimed is:

1. A yarn-carrying and dispensing apparatus, comprising:
    a yarn-carrying portion that accommodates a ball of yarn, the yarn-carrying portion having a joint that allows the yarn-carrying portion to open so that the ball of yarn can be placed inside, and one or more yarn-dispensing holes through which the yarn is dispensed from the yarn-carrying portion;
    a base portion with a gasket portion and a bottom portion to allow the yarn-carrying and dispensing apparatus to sit on a surface; and
    a yarn-carrying collar portion that is affixed to a portion of the yarn-carrying portion to connect the yarn-carrying portion to the base portion;
    wherein the yarn-carrying portion includes yarn pass-through channels that connect to the openings to allow the yarn to be more effectively dispensed from the ball of yarn in the yarn-carrying portion, and wherein the yarn pass-through channels are curved.

2. The yarn-carrying and dispensing apparatus of claim 1, wherein the yarn-carrying portion is a substantially hollow sphere-shaped portion that accommodates a similarly spherically-shaped ball of yarn.

3. The yarn-carrying and dispensing apparatus of claim 1, wherein the yarn-carrying portion is a hollow plastic ball of four to six inches in diameter.

4. The yarn-carrying and dispensing apparatus of claim 1, wherein the yarn-carrying portion is made of one of plastic, glass, cardboard, and metal.

5. The yarn-carrying and dispensing apparatus of claim 1, wherein the joint separates a first half of the yarn-carrying portion from a second half of the yarn-carrying portion, wherein the first half of the yarn-carrying portion has a narrow-diameter edge or lip that fits or snaps snugly inside a wider-diameter edge or lip of the second half of the yarn-carrying portion.

6. The yarn-carrying and dispensing apparatus of claim 1, wherein the one or more yarn-dispensing holes enables the yarn to be dispensed at different angles and positions from the yarn-carrying portion, and wherein the one or more yarn-dispensing holes are of large enough diameter to allow the yarn to easily pass through without significant resistance.

7. The yarn-carrying and dispensing apparatus of claim 1, wherein the yarn-carrying collar portion provides a mechanism for connecting the yarn-carrying portion to straps that enable a user to easily carry around the yarn-carrying and dispensing apparatus.

8. The yarn-carrying and dispensing apparatus of claim 1, wherein the yarn-carrying collar portion is sized to fit snugly in the base portion.

9. The yarn-carrying and dispensing apparatus of claim 1, wherein the yarn-carrying collar portion includes openings through which a strap is fed to hang from a user's shoulder, wherein the yarn-carrying collar portion is sized to fit snugly in drink holders in vehicles, trains, and planes.

10. The yarn-carrying and dispensing apparatus of claim 1, wherein the base portion is weighted substantially enough to hold the yarn-carrying and dispensing apparatus in place when the yarn is dispensed from the yarn-carrying portion.

11. The yarn-carrying and dispensing apparatus of claim 1, wherein the bottom portion of the base portion is flat and is of one or more of wider, less or same diameter as the gasket portion and the yarn-carrying portion.

12. The yarn-carrying and dispensing apparatus of claim 1, wherein the gasket portion and the bottom portion of the base portion are formed as one piece, and wherein the base portion and the yarn-carrying portion can easily come apart so that a user can travel with just the yarn-carrying portion.

13. A thread or string-carrying and dispensing apparatus, comprising:
    a thread or string-carrying portion that accommodates a ball of thread or string, the thread or string-carrying portion having a joint that allows the thread or string-carrying portion to open so that the ball of thread or string can be placed inside, and one or more thread or string-dispensing holes through which the thread or string is dispensed from the thread or string-carrying portion;
    a base portion with a gasket portion and a bottom portion to allow the thread or string-carrying and dispensing apparatus to sit on a surface; and
    a thread or string-carrying collar portion that is affixed to a portion of the thread or string-carrying portion to connect the thread or string-carrying portion to the base portion;
    wherein the thread or string-carrying portion includes thread or string pass-through channels that connect to the openings to allow the thread or string to be more effectively dispensed from the ball of thread or string in the thread or string-carrying portion, and wherein the thread or string pass-through channels are curved.

* * * * *